Dec. 13, 1955    R. B. COTTRELL    2,726,740
BRAKE BEAM
Filed May 6, 1950    5 Sheets-Sheet 1

INVENTOR.
Robert B. Cottrell
BY
Orrin O. B. Garner  Atty.

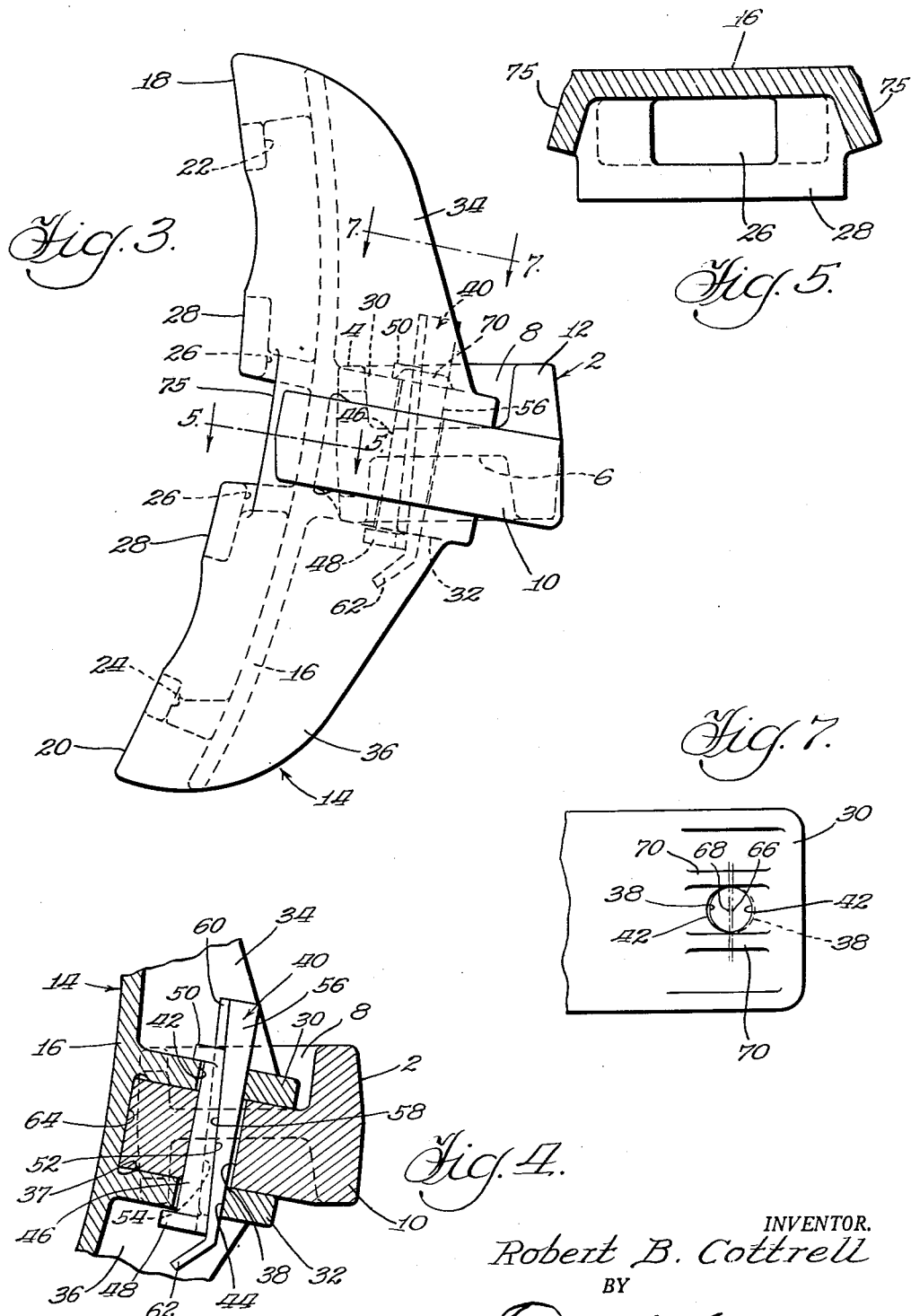

Dec. 13, 1955    R. B. COTTRELL    2,726,740
BRAKE BEAM
Filed May 6, 1950    5 Sheets-Sheet 3
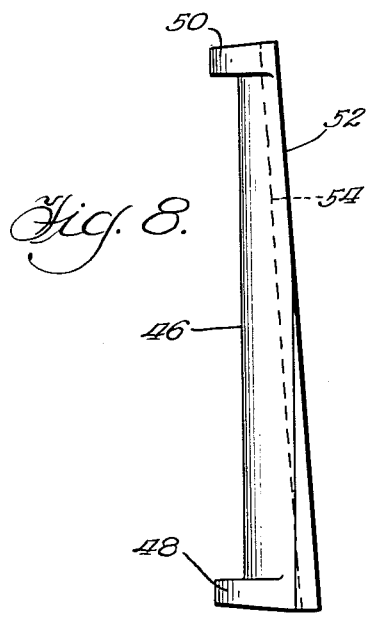
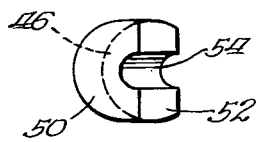
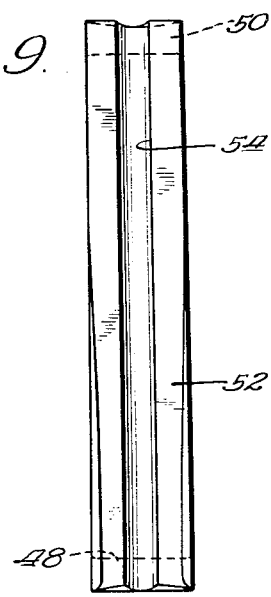
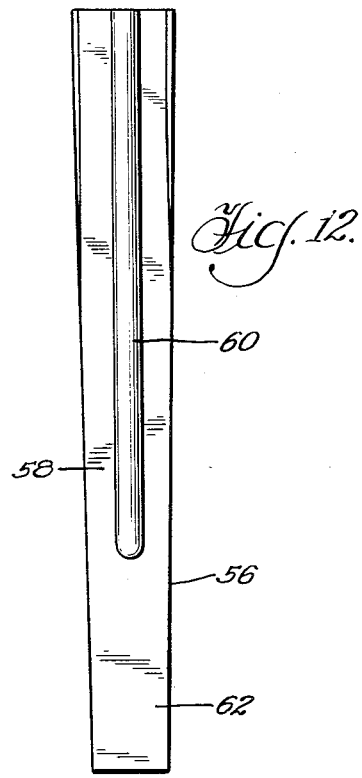
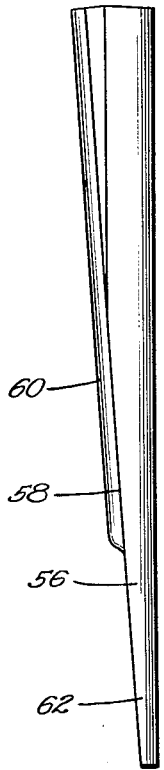
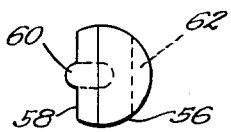
INVENTOR.
Robert B. Cottrell
BY Dec. 13, 1955 R. B. COTTRELL 2,726,740
BRAKE BEAM
Filed May 6, 1950 5 Sheets-Sheet 4
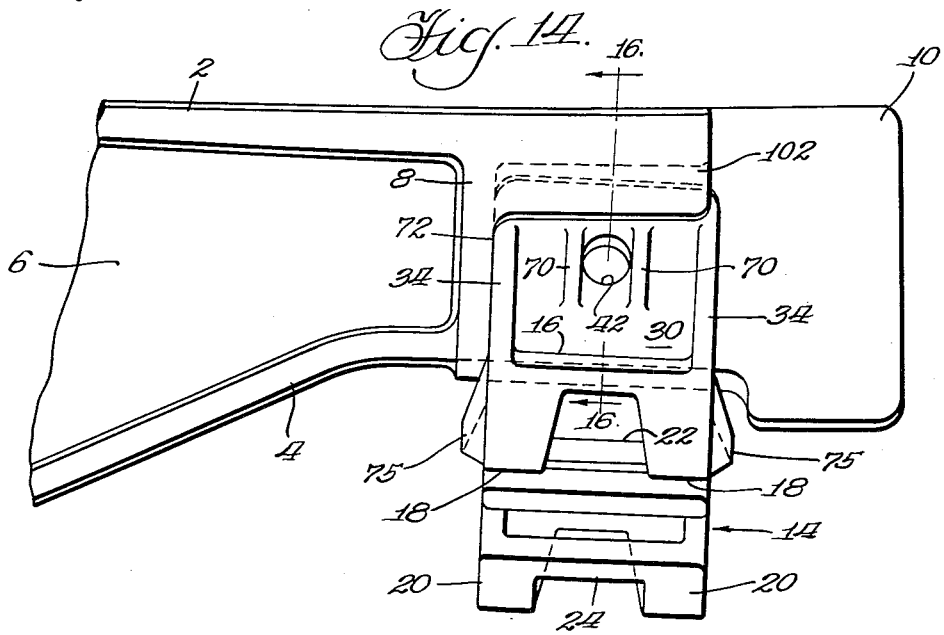
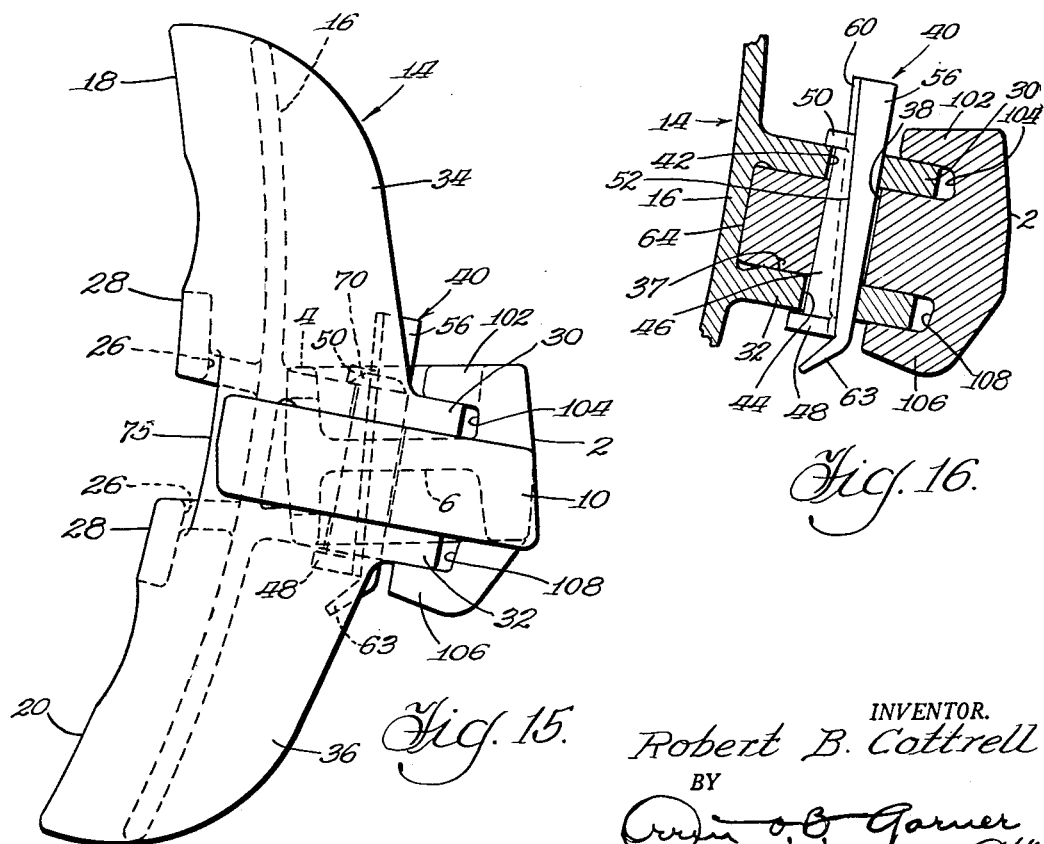
INVENTOR.
Robert B. Cottrell
BY

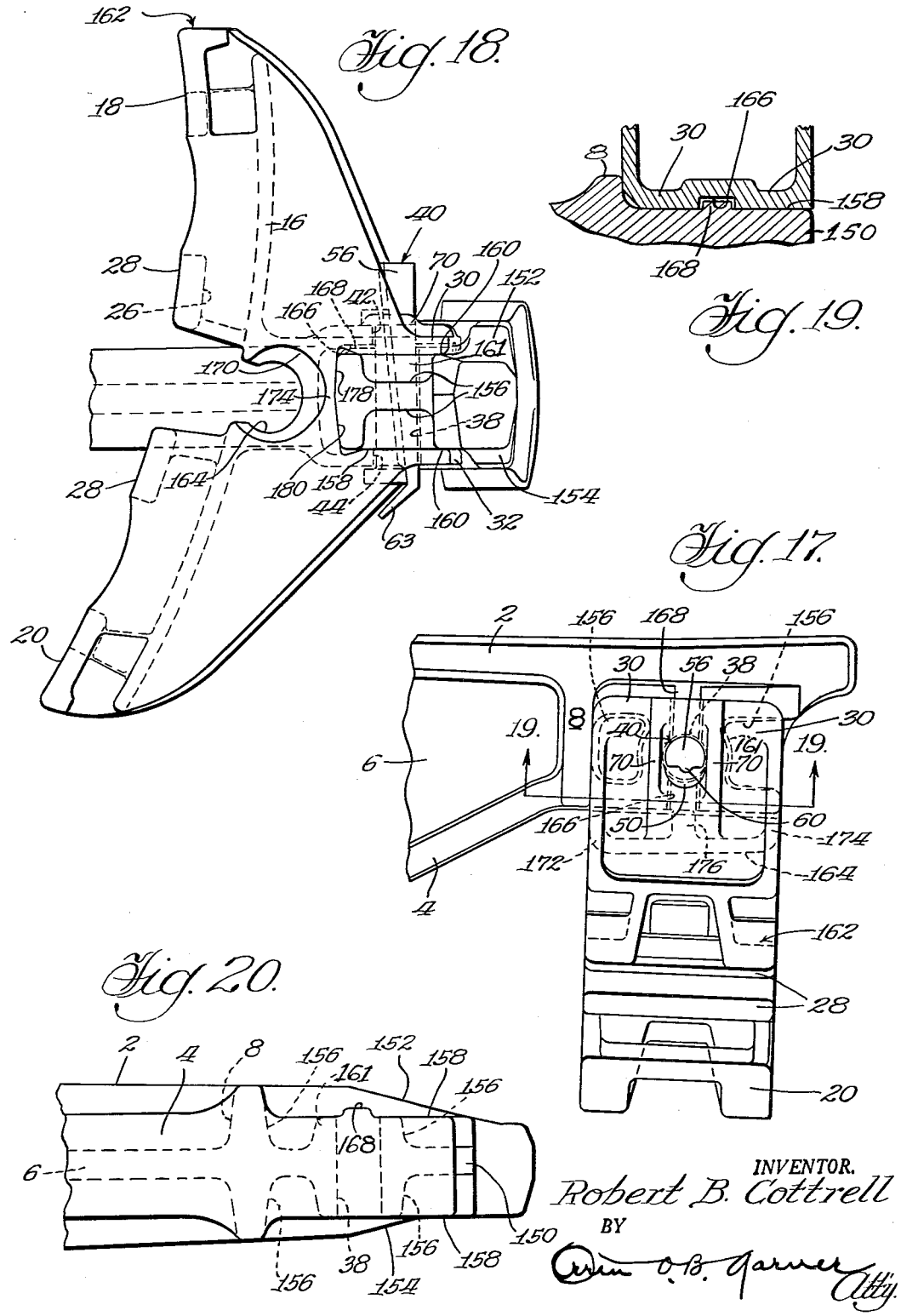

United States Patent Office 2,726,740
Patented Dec. 13, 1955

2,726,740
BRAKE BEAM

Robert B. Cottrell, Deerfield, Ill., assignor to American Steel Foundries, Chicago, Ill., a corporation of New Jersey Application May 6, 1950, Serial No. 160,566

10 Claims. (Cl. 188—223.1)

This invention relates to railway brake beams and more particularly to a novel beam having a readily detachable brake head.

A general object of the invention is to devise a beam of economical and sturdy construction, wherein the brake heads may be readily attached and detached for replacement or repair.

A more specific object of the invention is to provide for the direct transmission of braking thrust from the brake head to the beam without imposing such forces on the key means which removably secure the head to the beam.

A further object of the invention is to devise a brake head key which may be quickly applied and removed, and which cannot be improperly assembled with the brake head.

Another object of the invention is to prevent the removable brake head from rotating about its key.

Still another object of the invention is to devise a novel brake head which may be quickly applied and removed with respect to a brake beam, and which is adapted to withstand the severe stresses of railway service.

The foregoing and other objects and advantages of the invention will become apparent from a consideration of the following specification and the accompanying drawings wherein:

Figure 3 is an end elevational view of the structure shown in Figure 1 with the brake head key in assembled position;

Figure 4 is a sectional view taken in the vertical plane indicated by the line 4—4 of Figure 1, and showing the brake head key in assembled position;

Figure 5 is a sectional view on the line 5—5 of Figure 3;

Figure 7 is a fragmentary plan view taken on the line 7—7 of Figure 3, and showing the relationship between the brake head and brake beam apertures for the reception of the brake head key;

Figure 1:
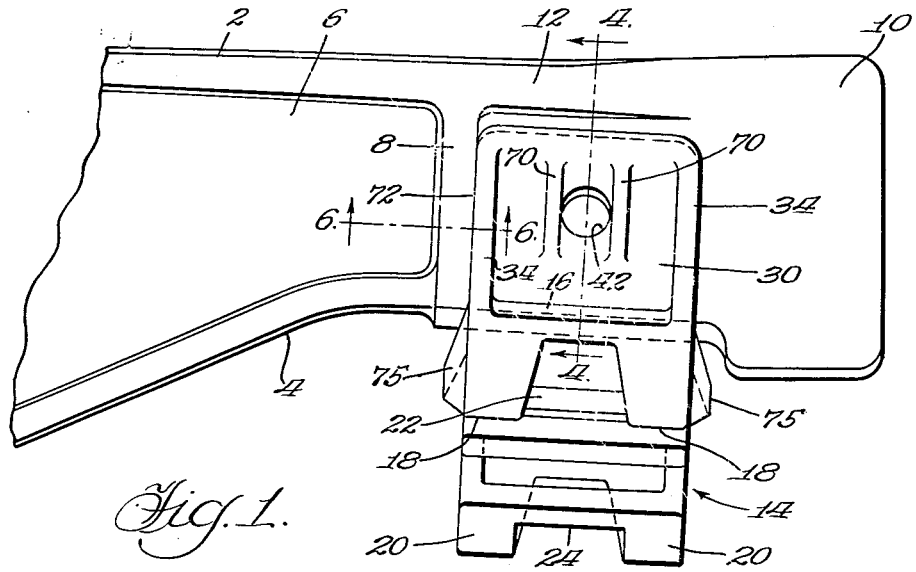
Figure 1 is a fragmentary top plan view of a brake beam structure embodying the invention, with the brake head key removed.
Figure 2:
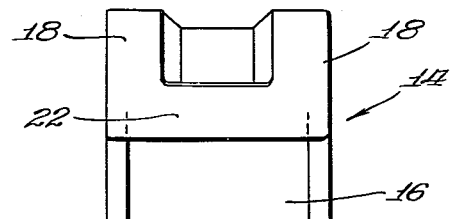
Figure 2 is a front elevational view of the structure shown in Figure 1.

Figures 8 to 10, inclusive, show one element of the novel key, Figure 8 being a side elevational view of said element, Figure 9 being an elevational view taken from the wedge face thereof, and Figure 10 being a plan view thereof;

Figures 11 to 13 show the other element of the key, Figure 11 being a side elevational view thereof, Figure 12 being an elevational view from the wedge face thereof, and Figure 13 being a plan view thereof;

Figures 14 to 16 show a modification of the brake head and beam structure, Figure 14 being a top plan view thereof, Figure 15 being an end elevational view thereof, and Figure 16 being a sectional view on the line 16—16 of Figure 14, showing the brake head key in assembled position.

Figures 17 to 20 show a further modification of the brake head and beam structure, Figure 17 being a fragmentary top plan view thereof, Figure 18 being an end view thereof, Figure 19 being a sectional view taken substantially on the line 19—19 of Figure 17, and Figure 20 being a fragmentary front view of the brake beam with the head removed.

Describing the invention in detail, and referring first to the embodiment thereof illustrated in Figures 1 to 13, the novel brake beam, as best seen in Figures 1 to 4, comprises a truss structure having a compression member 2, a tension member 4 and a horizontal web 6 disposed in the plane of said truss structure and connecting the members 2 and 4 at each end of the beam. It will be understood, by those skilled in the art, that the beam is provided, at its central portion, with a conventional strut (not shown) connecting the members 2 and 4 and affording means for connection to associated actuating means, such as a brake lever (not shown).

The members 2 and 4 and the web 6 are connected at each end of the beam to a substantially vertical wall or web 8, which is connected along its outboard surface to a flat diagonal segment 10, the top surface of which merges along its rear edge with a downwardly inclined portion 12 of the compression member 2, outboard the web 8.

The segment 10 is adapted to support a novel brake head, generally designated 14, said head having a front wall 16 formed in the usual manner with a pair of spaced end or toe lugs 18 at its upper end and with a pair of similar end or toe lugs 20 at its lower end. The upper lugs 18 are connected by a tie 22, and the lower lugs 20 are connected by a tie 24 for cooperation with a conventional brake shoe key (not shown) extending through openings or apertures 26 in a pair of spaced intermediate lugs 28 on the front surface of the front wall 16. It will be readily understood, by those skilled in the art, that the lugs 18, 20 and 28 are adapted to afford support for associated brake shoe means (not shown).

The segment 10, outboardly of the head 14, is adapted to afford slidable support for the beam from an associated truck bracket (not shown).

The rear surface of the front brake head wall 16 is provided with top and bottom walls or webs 30 and 32, disposed diagonally with respect to the horizontal plane of the truss structure, the top wall 30 being connected by spaced inboard and outboard vertical walls or webs 34 to the front wall 16, and the bottom wall or web 32 being connected by similar inboard and outboard webs 36 to the front wall 16 of the head.

As best seen in Figure 4, the top and bottom brake head walls 30 and 32 define a slot or jaw 37, snugly confining the brake beam segment 10, which is provided with a substantially round opening or aperture 38 for the reception of a novel key, generally designated 40. The key also extends through openings or apertures 42 and 44 in the walls 30 and 32, respectively.

The novel key 40 is shown in detail in Figures 8 to 13, inclusive, wherein Figures 8 to 10 illustrate one element of the key, said element comprising a substantially semicylindrical body or shank 46 having heads or lugs 48 and 50 at opposite ends thereof and having on one side thereof a wedge face 52 interrupted by a groove 54 extending lengthwise of the shank 46 from end to end thereof.

Figures 11 to 13 illustrate the other element of the novel key 40, said element comprising a substantially semicylindrical body or shank 56 having a wedge face 58 on one side thereof, adapted to mate with the wedge face 52, as hereinafter described. The wedge face 58 is interrupted by a tongue 60, extending lengthwise of the shank 56 and adapted for reception within the groove 54. As best seen in Figures 11 and 12, the shank tapers downwardly to form a malleable lug or extension 62, at its lower end, below the tongue 60.

Referring again to Figure 4, it will be seen that the key 40, in assembled position, is arranged with the wedge faces 52 and 58 in engagement, and the tongue 60 is received within the groove 54. The head 50 of the shank 46 is supported on the top brake head wall 30, and the shank 56 is tightly wedged by means of the faces 52 and 58 against the rear edges of the apertures 42 and 44, the shank 46 being tightly wedged against the forward edge of the aperture 38 to urge the rear surface of the front brake head wall 16 tightly against the forward surface of the brake beam segment 10, as at 64. The lower end or lug 62 of the shank 56 is peened or bent, as at 63, to afford an interlock with the lower end of the shank 46.

Figure 7 shows the relationship between the brake head and brake beam apertures, and it will be understood, by a consideration of this figure, that the center or axis of the brake beam aperture 38 is disposed at 66 rearwardly of the center or axis 68 of brake head apertures 42 and 44, which are substantially coaxial. Thus, in assembling the key 40, the shank 46 is inserted through the apertures 42, 38 and 44 in complementary, arcuate face engagement with the forward edge of the brake beam aperture 38, the head 50 being snugly confined between a pair of lugs 70, formed on the top of the brake head wall 30 to prevent rotation of the shank 46 from its position in engagement with the front edge of the aperture 38. Thereupon, the wedge shank 56 is engaged, as shown in Figure 4, with the shank 46 along the complementary wedge faces 52 and 58, the tongue 60 being received within the groove 54 to prevent angularity between the shanks 46 and 56. Thus, with the shank 56 in complementary, arcuate face engagement with the rear edges of the brake head apertures 42 and 44, the shank 56 is tightly urged to the wedged position shown in Figure 4, as for example, by pounding with a hammer, and thereafter, the lug 62 is bent to the position shown in Figure 4 to maintain the parts in the wedged position shown in that figure.

Figure 6:
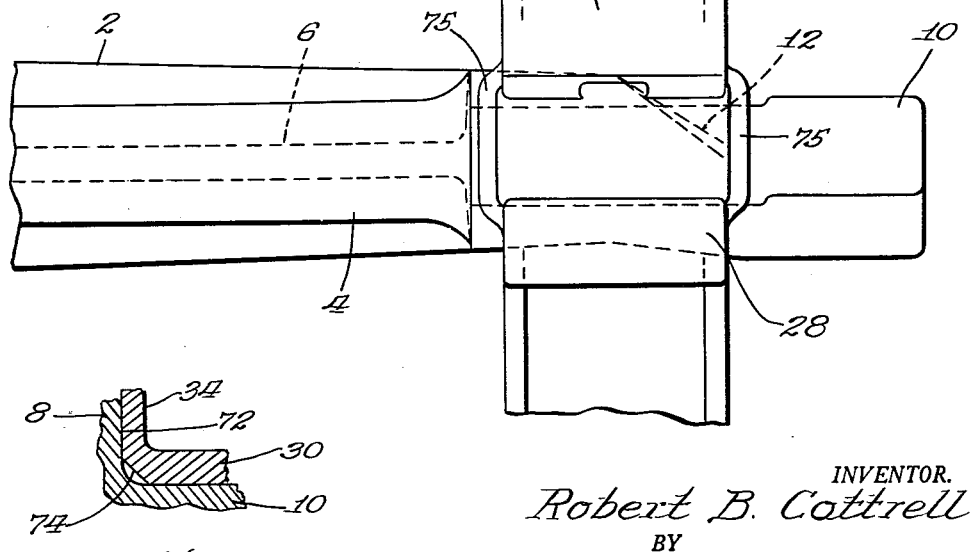
Figure 6 is a sectional view on the line 6—6 of Figure 1.

Rotation of the brake head 14, about the key 40, is prevented by snug engagement of the inboard brake head webs 34 and 36 with the vertical brake beam web 8, as best seen in the sectional view of Figure 6, which is a fragmentary sectional view through the inboard web 34 and the brake beam web 8. It will be understood, from a consideration of this figure, that the webs 34 and 36 are snugly engaged, as at 72, the brake head webs 30 and 32 being relieved or beveled at 74, at their merger, to accommodate seating of the web 30 against the beam segment 10, and seating of the web 34 against the beam web 8, at 72 (Figure 6). It will be understood that the brake head being symmetrical is also seated along its inboard web 36, against the beam web 8. In this connection, it may be noted, as best seen in Figure 1, that the forward face of the front brake head wall 16 is diagonally disposed with respect to the longitudinal center line of the beam to afford a complementary flat seat at 72 for the inboard brake head webs 34 and 36, while accommodating the before-mentioned angularity between the front face of the brake head and the longitudinal center line of the beam, said angularity affording a taper of approximately one inch in 20 inches, corresponding to the taper of a conventional AAR standard freight car wheel.

As best seen in Figures 1 to 3 and 5, the front brake head wall 16 is provided, between the intermediate lugs 28, with diverging inboard and outboard flanges or webs 75 connecting the intermediate brake head lugs 28 to reinforce the wall 16 between these lugs, inasmuch as the space therebetween is aligned with the jaw or slot 37, which receives the brake beam segment 10 to afford a torque connection between said segment and the walls 30 and 32 of the brake head.

Referring now to Figures 14 to 16, inclusive, a modification is shown wherein parts corresponding to those of Figures 1 to 13 inclusive, are identified by corresponding numerals. In the modification of Figures 14 to 16, the compression member 2, outboardly of the web 8, is flanged, as at 102, to define a diagonal slot or recess 104 complementary to and snugly confining the top brake head wall 30 and the bottom of the compression member, outboard the web 8, is similarly flanged, as at 106, to define a diagonal slot or recess 108 approximately parallel to the recess 104, and snugly confining the bottom brake head wall 32. It will be understood that the flanges 102 and 106 and the slots 104 and 108, defined thereby, provide means for transmitting torque forces from the brake head 14 to the brake beam truss, thereby avoiding the transmission of such forces to the key 40, which is identical with that described in connection with the preceding embodiment.

Referring now to Figures 17 to 20 inclusive, a further modification is shown wherein parts corresponding to those of the previous modifications are identified by corresponding reference numerals. In the modification of Figures 17 to 20, the compression member 2 outboardly of the web 8 is joined on its forward side with the rear edge of a segment 150 which is located in the plane of web 6 and joined at its inboard edge with the outboard side of web 8. The compression member 2 is tapered at its top and bottom edges as at 152 and 154 above and below the segment 150.

The segment 150 is cored away between its forward and rear edges on its top and bottom sides as at 156, 156 inboardly and outboardly of the opening 38 in segment 150 to provide substantially flat bearing surfaces 158, 158 of limited area on its top and bottom sides adjacent its forward edge forwardly of opening 38 and flat bearing surfaces 160, 160 of limited area adjacent its rear and rearwardly of opening 38. The segment 150 appears H-shaped in elevation, as viewed from the outboard end of the beam. The coring at 156 produces a boss 161 centrally on segment 150 around opening 38, the boss providing top and bottom surfaces for seating the head. The top areas 158 and 160 and top of boss 161 provide seats for the top web 30 of the brake head, and the bottom areas 158 and 160 and bottom of boss 161 provide seats for the bottom web 32 of the brake head.

In the present embodiment the brake head 162 is of the hanger suspension type and comprises in addition to the parts which are similar to the brake heads heretofore shown, a hanger socket 164 intermediate its ends. The head comprises a groove 166 in the underside of web 30 which receives a tongue 168 on the top side of segment 150, said tongue and groove extending transversely of the beam and serving as an assembly guide to prevent misapplication of the head to the beam.

In the present embodiment the front wall is curved rearwardly intermediate its ends as at 170, to provide the above-mentioned socket 164 at its forward side, and the rear side of the portion 170 and the top and bottom webs 30 and 32 are connected to rearwardly extending generally vertical inboard and outboard webs 172 and 174 and an intermediate web 176. The rear edges of webs 172, 174 and 176 are formed complementary to and engage the forward face of the segment 150, said engagement taking place along downwardly and upwardly sloping surfaces 178 and 180 on the top and bottom sections of webs 172 to 176 and on the forward face of segment 50, said faces 178 and 180 converging forwardly of the beam and merging at a line substantially in the horizontal center plane of the beam. This feature has the tendency to center the brake head and to aid in preventing vertical shifting of the head.

By providing the webs 172 to 176, the seating area between the rear side of the brake head and forward side of segment 150 is reduced whereby extensive machining is materially reduced or entirely eliminated. Similarly the reduction of the seating areas on the top and bottom sides of the segment 150 also assures good snug fitting between the webs 30 and 32 and the segment 150.

It will be noted that the tongue 168 merges with its rear end with the forward side of the compression member 2, thus serving to further strengthen the segment 150 and its connection with the compression member.

In all other respects, the securement of the brake head to the beam is substantially the same as that in the previous embodiments.

I claim:

1. A brake beam comprising tension and compression members and an interconnecting web therebetween, a substantially vertical transverse wall connected at its inboard side with the outboard edge of the web and outboard end of said tension member, a segment extending flatwise longitudinally of the beam and connected at its inboard edge to the outboard side of said wall intermediate the top and bottom edges thereof, said compression member merging with the rear edge of said wall and extending outboardly of said wall and merging with said segment along the rear edge thereof, a brake head comprising a jaw at its rear having top and bottom webs embracing said segment and having a rearwardly facing surface in abutment with a forwardly facing surface on the front edge of said segment, said top and bottom webs having flat face engagement at their inboard edges with the outboard side of said wall, and means for securing the head in position on said segment with said webs against said wall and comprising openings through said webs and segment, and a split key having two elements in wedge engagement with each other, one element bearing against the rear edges of the openings in the top and bottom webs and the other element bearing against the forward edge of the opening in said segment, said compression member having a web extending along said segment at least to a point in alignment transversely of the beam with the outboard edge of the forward side of the head.

2. A railway brake beam comprising a truss structure including tension and compression members, and a web connected thereto, said structure having a segment connected to said web and extending outboardly therefrom to afford a brake head seat, a brake head having top and bottom webs defining a jaw receiving said seat, the inboard edge of said head being engaged with said web along surfaces extending transversely of the beam, spaced lugs on at least one of said top and bottom webs externally of said jaw, apertures through said top and bottom webs and said segment, abutments on the head and segment forwardly of said apertures, and key means extending through said apertures for securing the head to the beam segment and for urging said abutments into tight engagement with each other, said key means comprising a pair of elements in wedge engagement with each other, one element engaging the rear edge of at least one web aperture and being spaced from the forward edge thereof, and the other key element engaging the forward edge of the segment aperture and being spaced from the rear edge thereof, at least one of said elements having a head confined between the related lugs for limiting rotational movement of said key means in said apertures.

3. A railway brake beam comprising a truss structure including tension and compression members and a web connected to the outboard ends thereof, said structure having a segment extending outboardly from said web, a brake head having top and bottom walls defining a jaw receiving said segment, the inboard edge of said head being in line engagement with said web, abutments on the head and segment disposed in a plane substantially normal to said web, apertures through said walls and segment disposed rearwardly of said abutments, and wedge means extending through said apertures for urging said abutments tightly into engagement with each other.

4. A brake beam, according to claim 3, wherein one of the brake head walls is provided with means for preventing rotational movement of the key means in said apertures.

5. A brake beam, according to claim 3, wherein the segment is provided with abutments, one of which bears against the upper surface of the top brake head wall, and the other of which bears against the lower surface of the bottom brake head wall.

6. In combination, a brake beam comprising tension and compression members interconnected at the ends thereof to form an end portion having a forwardly facing bearing surface, a brake head receiving said end portion, a web on the end portion adjacent the head having abutment surfaces on the top and bottom of said portion, said surfaces being disposed transversely of the beam, said brake head having a rearwardly facing surface engageable with said bearing surface and other surfaces in engagement with said abutment surfaces, and means for detachably securing said head to said portion and for tightly urging said surfaces into abutment with each other, said means comprising apertures through the head and portion, respectively, and a split key having two elements in wedge engagement with each other, one element bearing against the rear edge of the head apertures, and the other element bearing against the forward edge of the aperture in said portion.

7. A railway brake beam comprising a truss structure having an end portion with top and bottom surfaces and an aperture therethrough, said end portion having vertical webs extending from said top and bottom surfaces, a brake head having a front wall seated along its rear surface against the front edge of said portion, said brake head having walls with apertures, said walls being arranged to engage said webs, and key means wedged between the front edge of the first-mentioned aperture and the rear edge of the second-mentioned apertures for holding said front wall tightly against said edge.

8. A brake beam according to claim 7, wherein the inboard edges of the walls comprise surfaces seated against other transverse surfaces on the webs, inboardly of the apertures for resisting rotation of the head relative to the key means.

9. A railway brake beam comprising a truss structure including tension and compression members and a segment outboardly thereof, bearing webs extending transversely of said beam from the top and bottom sides thereof defining the inboard limit of said segment, a brake head having front, top and bottom walls defining a slot receiving said segment, apertures through said top and bottom walls and said segment, and wedge means extending through said apertures for tightly urging the head and segment into engagement with each other at the inner end of said slot and for positioning said head in abutment with said bearing webs whereby rotational movement of said head about said wedge means is prevented.

10. A combination according to claim 6, wherein said transversely disposed abutment surfaces are formed on said web inboardly of the brake head.

References Cited in the file of this patent

UNITED STATES PATENTS

| | | |
|---|---|---|
| 429,674 | Bemis | June 10, 1890 |
| 455,637 | Nethercott | July 7, 1891 |
| 803,313 | Streib | Oct. 31, 1905 |
| 950,653 | Bettendorf | Mar. 1, 1910 |
| 2,170,120 | Busch | Aug. 22, 1939 |
| 2,172,976 | Johnson | Sept. 12, 1939 |
| 2,398,917 | Busch | Apr. 23, 1946 |
| 2,473,316 | Walker et al. | June 14, 1949 |
| 2,490,204 | Busch | Dec. 6, 1949 |